(12) United States Patent
Miao et al.

(10) Patent No.: US 11,132,581 B2
(45) Date of Patent: Sep. 28, 2021

(54) METHOD AND APPARATUS FOR FACE IMAGE DEDUPLICATION AND STORAGE MEDIUM

(71) Applicant: BEIJING SENSETIME TECHNOLOGY DEVELOPMENT CO., LTD, Beijing (CN)

(72) Inventors: Wenjian Miao, Beijing (CN); Qian Chen, Beijing (CN); Duanguang Shi, Beijing (CN)

(73) Assignee: BEIJING SENSETIME TECHNOLOGY DEVELOPMENT CO., LTD, Beijing (CN)

( * ) Notice: Subject to any disclaimer, the term of this patent is extended or adjusted under 35 U.S.C. 154(b) by 219 days.

(21) Appl. No.: 16/412,854

(22) Filed: May 15, 2019

(65) Prior Publication Data

US 2019/0266441 A1    Aug. 29, 2019

Related U.S. Application Data

(63) Continuation of application No. PCT/CN2018/096542, filed on Jul. 20, 2018.

(30) Foreign Application Priority Data

Jul. 21, 2017 (CN) .......................... 201710605539.3
Jan. 16, 2018 (CN) .......................... 201810041797.8

(51) Int. Cl.
*G06K 9/62*    (2006.01)
*G06K 9/00*    (2006.01)
(Continued)

(52) U.S. Cl.
CPC ....... *G06K 9/6215* (2013.01); *G06F 16/1748* (2019.01); *G06F 16/51* (2019.01);
(Continued)

(58) Field of Classification Search
USPC ......................................................... 382/118
See application file for complete search history.

(56) References Cited

U.S. PATENT DOCUMENTS 6,549,914 B1 * 4/2003 Valys .................. G06F 16/9577
8,705,813 B2 * 4/2014 Matsuyama ....... G06K 9/00295
382/118
(Continued)

FOREIGN PATENT DOCUMENTS

CN        102799877 A    11/2012
CN        102880726 A    1/2013
(Continued)

OTHER PUBLICATIONS

First Office Action of the Japanese application No. 2019-553920, dated Oct. 13, 2020.
(Continued)

*Primary Examiner* — Ishrat I Sherali
(74) *Attorney, Agent, or Firm* — Syncoda LLC; Feng Ma

(57) ABSTRACT

Methods and apparatuses for face image deduplication as well as non-transitory computer-readable storage medium include: filtering a plurality of obtained first face images to obtain at least one second face image with image quality reaching a first preset condition; matching the second face image with at least one third face image in an image queue to obtain a matching result; and determining, according to the matching result, whether to perform deduplication operation on the second face image.

20 Claims, 8 Drawing Sheets

(51) Int. Cl.
  *G06F 16/535* (2019.01)
  *G06F 16/174* (2019.01)
  *G06F 16/583* (2019.01)
  *G06F 16/51* (2019.01)

(52) U.S. Cl.
  CPC .......... *G06F 16/535* (2019.01); *G06F 16/583* (2019.01); *G06K 9/00288* (2013.01); *G06K 9/00295* (2013.01); *G06K 9/00744* (2013.01); *G06K 9/00926* (2013.01)

(56) References Cited

U.S. PATENT DOCUMENTS

| | | | |
|---|---|---|---|
| 9,230,157 B2 * | 1/2016 | Bataller | G06T 7/246 |
| 9,298,976 B2 * | 3/2016 | Je | G06F 16/51 |
| 9,384,518 B2 * | 7/2016 | Chung | G06Q 10/00 |
| 10,032,076 B2 * | 7/2018 | Zhang | G06K 9/00624 |
| 10,083,368 B2 * | 9/2018 | Krishnamoorthi | G06K 9/4671 |
| 10,438,056 B2 | 10/2019 | Liang | |
| 2008/0112598 A1 | 5/2008 | Gabara | |
| 2011/0311112 A1 * | 12/2011 | Matsuyama | G06K 9/00281 382/118 |
| 2013/0195316 A1 * | 8/2013 | Bataller | G06K 9/6255 382/103 |
| 2013/0246790 A1 | 9/2013 | Wang | |
| 2013/0246811 A1 | 9/2013 | Wang | |
| 2013/0251214 A1 * | 9/2013 | Chung | G06K 9/00161 382/116 |
| 2013/0336590 A1 * | 12/2013 | Sentinelli | G06F 16/739 382/218 |
| 2014/0075193 A1 | 3/2014 | Wang | |
| 2015/0088625 A1 | 3/2015 | Eronen | |

FOREIGN PATENT DOCUMENTS

| | | |
|---|---|---|
| CN | 103237040 A | 8/2013 |
| CN | 103793697 A | 5/2014 |
| CN | 103824053 A | 5/2014 |
| CN | 103984738 A | 8/2014 |
| CN | 104166694 A | 11/2014 |
| CN | 104679913 A | 6/2015 |
| CN | 105243373 A | 1/2016 |
| CN | 105513101 A | 4/2016 |
| CN | 105701466 A | 6/2016 |
| CN | 105760461 A | 7/2016 |
| CN | 106204779 A | 12/2016 |
| CN | 106570465 A | 4/2017 |
| CN | 108228871 A | 6/2018 |
| CN | 108228872 A | 6/2018 |
| JP | 2007102341 A | 4/2007 |
| JP | 2007102342 A | 4/2007 |
| JP | 2010003021 A | 1/2010 |
| JP | 2010055594 A | 3/2010 |
| JP | 2010218059 A | 9/2010 |
| JP | 2015222582 A | 12/2015 |
| WO | 2008072622 A1 | 6/2008 |
| WO | 2017016146 A1 | 2/2017 |

OTHER PUBLICATIONS

First Office Action of the Japanese application No. 2019-553912, dated Nov. 10, 2020.
English Translation of the Written Opinion of the International Search Authority in the international application No. PCT/CN2018/096542, dated Oct. 18, 2018.
English Translation of the Written Opinion of the International Search Authority in the international application No. PCT/CN2018/096540, dated Oct. 18, 2018.
International Search Report in the international application No. PCT/CN2018/096542, dated Oct. 18, 2018.
International Search Report in the international application No. PCT/CN2018/096540, dated Oct. 18, 2018.
First Office Action of the U.S. Appl. No. 16/413,611, dated Feb. 11, 2021.

* cited by examiner

METHOD AND APPARATUS FOR FACE IMAGE DEDUPLICATION AND STORAGE MEDIUM

CROSS-REFERENCE TO RELATED APPLICATIONS

The present application is a continuation of, and claims priority to, International Application No. PCT/CN2018/096542 filed on Jul. 20, 2018, which claims priority to Chinese Patent Application No. 201710605539.3 filed on Jul. 21, 2017 and Chinese Patent Application No. 201810041797.8 filed on Jan. 16, 2018. The disclosures of these applications are hereby incorporated by reference in their entirety.

BACKGROUND

An image contains rich and intuitive information. Currently, in the field of social, shopping, travel and the like on the Internet, a large number of images are needed to convey information for a user. As the number of images continues to increase, the number of duplicate images also increases. Therefore, an image information provider needs to perform image deduplication before the use of image information, so as to avoid the duplicate images from affecting user experience and increasing the workload of image maintenance. With the rapid development of the Internet, the image provider acquires a large amount of image information every day by means of user upload and crawler download and the like, and the amount has far exceeded the limit of manual review.

SUMMARY

The present disclosure relates to computer vision technologies, and in particular, to a method for face image deduplication, an apparatus for face image deduplication and a non-transitory computer-readable storage medium.

Embodiments of the present disclosure provide technologies for face image deduplication.

According to a first aspect of the embodiments of the present disclosure, there is provided a method for face image deduplication, including: filtering a plurality of obtained first face images to obtain at least one second face image with image quality reaching a first preset condition; matching the second face image with at least one third face image in an image queue to obtain a matching result; and determining, according to the matching result, whether to perform deduplication operation on the second face image.

According to a second aspect of the embodiments of the present disclosure, there is provided an apparatus for face image deduplication, including: a memory storing processor-executable instructions; and a processor arranged to execute the stored processor-executable instructions to perform: filtering a plurality of obtained first face images to obtain at least one second face image with image quality reaching a first preset condition; matching the second face image with at least one third face image in an image queue to obtain a matching result; and determining, according to the matching result, whether to perform deduplication operation on the second face image.

According to a third aspect of the embodiments of the disclosure, there is provided a non-transitory computer-readable storage medium having stored thereon computer-readable instructions that, when executed by a processor, cause the processor to execute a method for face image deduplication, the method including: filtering a plurality of obtained first face images to obtain at least one second face image with image quality reaching a first preset condition; matching the second face image with at least one third face image in an image queue to obtain a matching result; and determining, according to the matching result, whether to perform deduplication operation on the second face image.

The following further describes in detail the technical solutions of the present disclosure with reference to the accompanying drawings and embodiments.

BRIEF DESCRIPTION OF DRAWINGS

The accompanying drawings constituting a part of the specification are used for describing embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
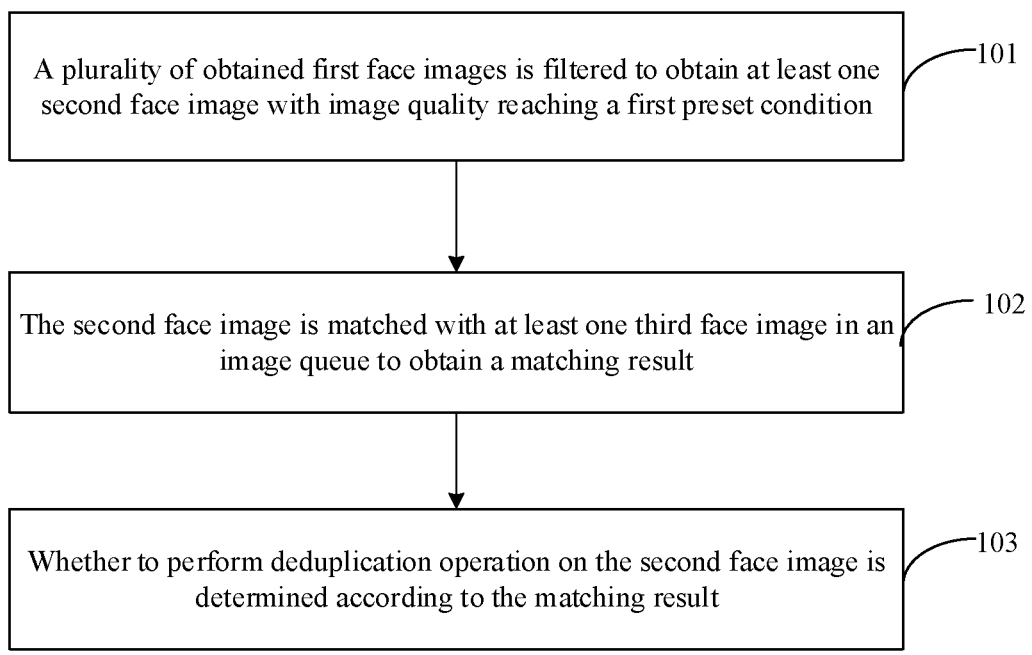
FIG. 1 is a flowchart of some embodiments of a method for face image deduplication according to the present disclosure.

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to persons of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to a computer system/server, which may operate with numerous other general-purpose or special-purpose computing system environments or configurations. Examples of well-known computing systems, environments, and/or configurations suitable for use together with the computer system/server include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The computer system/server may be described in the general context of computer system executable instructions (for example, program modules) executed by the computer system. Generally, the program modules may include routines, programs, target programs, assemblies, logics, data structures, and the like, to perform specific tasks or implement specific abstract data types. The computer system/server may be practiced in the distributed cloud computing environments in which tasks are executed by remote processing devices that are linked through a communications network. In the distributed computing environments, program modules may be located in local or remote computing system storage media including storage devices.

FIG. 1 is a flowchart of some embodiments of a method for face image deduplication according to the present disclosure. The method is implemented by an apparatus for face image deduplication, such as a terminal device and a server. Embodiments of the present disclosure do not define the specific implementation of the apparatus for face image deduplication.

At block 101, a plurality of obtained first face images is filtered to obtain at least one second face image with image quality reaching a first preset condition.

According to one or more embodiments of the present disclosure, the display quality of a face image is evaluated by means of a face angle, a face width and height value, and a face blurring degree. However, this embodiment does not limit a specific index based on which the display quality of the face image is evaluated. After obtaining second face images with the display quality meets a standard, a plurality of second face images corresponding to the same person are further deduplicated. In the case of obtaining a plurality of second face images, with the display quality meets the standard, of the same person based on a video, if said second face images are all transmitted to a subsequent operating device, a great load will be caused, and a lot of resources will be consumed to do useless work.

In an optional example, the block 101 may be executed by a processor by invoking a corresponding instruction stored in a memory, or may be executed by a filtering unit 21 run by the processor.

At block 102, the second face image is matched with at least one third face image in an image queue to obtain a matching result.

In one or more optional embodiments, the image queue includes at least one third face image separately corresponding to a different person. According to one or more embodiments of the present disclosure, the image queue may also include a face feature corresponding to each of the at least one third face image corresponding to a different person. It is practicable in the image queue that a face image and/or a face feature corresponding to the face image separately corresponds to a different person (for example, each face image corresponds to a person), or a part of images included therein separately corresponds to a different person. According to one or more embodiments of the present disclosure, whether two face images are matched is identified based on a distance between face features corresponding to the face images; and the distance between the face features includes, but is not limited to, a cosine distance, a Euclidean distance, etc. This embodiment does not limit a method for calculating a distance between specific features.

According to one or more embodiments of the present disclosure, the second face image and the third face image in the image queue are matched based on a feature of the second face image and a face feature of the third face image in the image queue; and whether the second face image is a duplicate image is determined according to a feature matching result.

In an optional example, the block 102 may be executed by a processor by invoking a corresponding instruction stored in a memory, or may be executed by a matching unit 22 run by the processor.

At block 103, whether to perform deduplication operation on the second face image is determined according to the matching result.

According to one or more embodiments of the present disclosure, if a face image obtained after filtering and a pre-stored face image correspond to the same person, the face image is the duplicate image, it is indicated that the face images corresponding to the person have been subjected to filtering deduplication, and at this time, the face image is chosen to be discarded or be used to replace the corresponding face image of the person in the image queue. However, if the face image obtained after filtering and the pre-stored face image do not correspond to the same person, the face image is not the duplicate image, it is indicated that a person corresponding to the face image is new, and the face image needs to be stored in the queue for use in subsequent recognition.

In an optional example, the block 103 may be executed by a processor by invoking a corresponding instruction stored in a memory, or may be executed by a deduplication unit 23 run by the processor.

On the basis of the method for face image deduplication provided in foregoing embodiment of the present disclosure, a plurality of obtained first face images are filtered to obtain at least one second face image with image quality reaching a first preset condition, such that quality-based filtering is achieved, the number of face images is reduced, the obtained face image quality meets subsequent requirements for face image processing, and the problem of repeatedly processing a large number of face images is avoided; and the second face image is matched with at least one third face image in an image queue to obtain a matching result, and whether to perform deduplication operation on the second face image is determined according to the matching result. Since whether the face image is stored is determined according to the known image queue, the duplicate face image is quickly identified.

According to another embodiment of the method for face image deduplication according to the present disclosure, on the basis of the foregoing embodiment, the filtering the plurality of obtained first face images includes:

filtering the plurality of obtained first face images based on a face attribute corresponding to the first face images.

A face attribute is used for indicating display quality of a face in a face image, and thus the face attribute corresponding to the first face images is used for indicating display quality of a face in the first face images.

According to one or more embodiments of the present disclosure, the face attribute includes, but is not limited to, one or more of: a face angle, a face width and height value, and a face blurring degree. According to one or more embodiments of the present disclosure, the face angle includes, but is not limited to, a yaw angle for indicating a turning angle of a face in the horizontal direction, a pitch angle for indicating a rotation angle of the face in the vertical direction, and a roll angle for indicating a deflection angle of the face in the vertical direction.

In one or more optional embodiments, the filtering the plurality of obtained first face images based on a face attribute corresponding to the first face images includes:

in response to meeting the first condition, determining that the image quality of the first face images reaches the first preset condition, where the first condition includes at least one of: the face angle is within the first preset range, the face width and height value is greater than the second preset threshold, and the face blurring degree is smaller than the third preset threshold;

or, acquiring the face attribute corresponding to the face in the face images to perform determination for the face attribute.

Matching at least one face image with the pre-stored face image in the image queue includes:

in response to meeting at least one of the following conditions: the face angle is within the first preset range, the face width and height value is greater than the second preset threshold, and the face blurring degree is smaller than the third preset threshold, matching each face image in the at least one face image with the pre-stored face image in the image queue.

Said filtering further includes:

in response to meeting at least one of the following conditions: the face angle is not within the first preset range, the face width and height value is smaller than or equal to the second preset threshold, and the face blurring degree is greater than or equal to the third preset threshold, deleting the face image.

For example, the first preset range is set to be ±20° (a specific value is set according to specific situations). If the yaw angle, the pitch angle, and the roll angle of the face angle all fall within ±20°, where the three angles are set to fall within an identical range or different ranges. The face width-height value includes a face width and a face height, which are generally returned by means of detection, and filtering is performed by setting the value. For example, the value is set to be 50 pixels, where a face image with the width and height smaller than 50 pixels is considered not to meet the condition. The values of the width and height are set to different values or an identical value. The face blurring degree is generally returned by means of Software Development Kit (SDK)-alignment, and is set to different values, such as, for example, setting to be 0.7, where a face image with a blurring degree greater than 0.7 is considered to be poor in quality. The values therein, i.e., ±20°, 50 pixels, and 0.7, are set thresholds, and are set according to actual situations.

The filtering the plurality of obtained first face images also includes: filtering the plurality of obtained first face images based on a face angle in the first face images, where the face angle is used for indicating a deflection angle of a face in the first face images. In the embodiments, the face angle in the first face images is used for indicating the deflection angle of the face in the first face images. The deflection angle is relative to a standard upright face, which refers to a face with angle values in horizontal, vertical, and inclined directions are all equal to 0. The face is used as a source point to calculate the deflection angle of a face.

The method further includes: filtering multiple frames of face images obtained from a video stream. Face image-based frame selection from a video stream can be achieved by filtering multiple frames of face images in the video stream. The face images in a video frame obtained by means of frame selection all meet the first preset condition.

Figure 2:
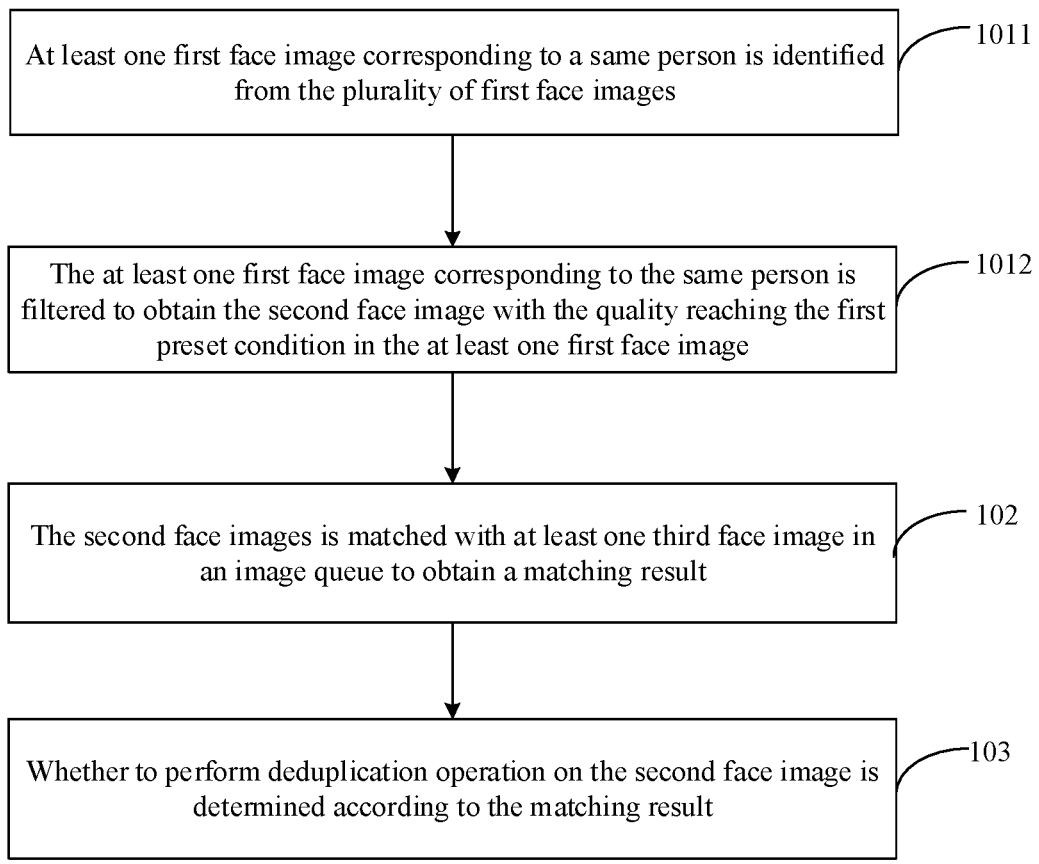
FIG. 2 is a flowchart of some embodiments of a method for face image deduplication according to the present disclosure.

In one or more optional embodiments, as shown in FIG. 2, block 101 includes blocks 1011 and 1012.

At block 1011, at least one first face image corresponding to the same person is identified from the plurality of first face images.

At block 1012, the at least one first face image corresponding to the same person is fileted to obtain, in the at least one first face image, a second face image with the quality reaching the first preset condition.

By filtering face images of the same person, a situation where faces of some people are not collected due to a quality issue when filtering is only directed to the first face images can be avoided, and the comprehensiveness of the obtained second face image is improved.

According to one or more embodiments of the present disclosure, the filtering process is implemented by establishing a face trajectory, including: obtaining the face trajectory based on at least one face image corresponding to the same person; and filtering a face image in the face trajectory based on the face angle corresponding to the face image to obtain, in the face trajectory, a face image with the quality reaching the first preset condition.

According to this embodiment, by means of filtering the face image in the face trajectory, an image with better quality is separately obtained for at least one person (for example, an image with better quality is obtained for each person) by determining, based on the face angle, whether the quality of the face image reaches the first preset condition, where the first preset condition can be adjusted according to a setting by a user, including a set angle range value or a setting that the image with better face quality is to be taken.

According to one or more embodiments of the present disclosure, the filtering the at least one first face image corresponding to the same person to obtain, in the at least one first face image, a second face image with the quality reaching the first preset condition includes:

filtering the at least one first face image corresponding to the same person based on the face angle corresponding to the first face image to obtain the second face image with the quality reaching the first preset condition.

By means of face angle-based filtering, a face with a great deflection angle will be excluded so as to obtain the second face image where the angle is within the set range.

In one or more optional embodiments, the face angle includes, but is not limited to, one or more of: the face yaw angle, the face pitch angle, and the face roll angle.

According to one or more embodiments of the present disclosure, the filtering the at least one first face image corresponding to the same person based on the face angle corresponding to the first face image to obtain the second face image with the quality reaching the first preset condition includes:

converting the face yaw angle, the face pitch angle, and the face roll angle corresponding to the first face image into a three-dimensional vector; and filtering the at least one first face image corresponding to the same person based on a distance from the three-dimensional vector to a source point to obtain the second face image with the quality reaching the first preset condition. The source point is a three-dimensional vector with all values equal to 0.

According to one or more embodiments of the present disclosure, the face image in the face trajectory is filtered based on the distance from the three-dimensional vector to the source point, and the source point is the three-dimensional vector with all values equal to 0.

In some embodiment, a distance value is obtained by calculating a square difference of the three-dimensional vectors obtained by converting the face yaw angle, the face pitch angle, and the face roll angle. The quality of the face image is evaluated according to the distance value. The smaller the distance is, the better the quality of the face image is, i.e., the face in the face image is more likely to be an upright face. However, in some embodiment, the distance value is not limited to be obtained by calculating the square difference and can also be obtained in other ways. Moreover, in order for quicker filtering, the face image in the face trajectory is filtered within a set time interval (such as within 5 or 10 seconds).

According to one or more embodiments of the present disclosure, the identifying, from the plurality of first face images, at least one first face image corresponding to the same person includes: identifying, from the plurality of first face images, at least one first face image corresponding to the same person within a first set duration; and the filtering the at least one first face image corresponding to the same person based on a distance from the three-dimensional vector to a source point to obtain the second face image with the quality reaching the first preset condition includes:

determining a first face image in the at least one first face image, of which three-dimensional vector has a smallest distance with the source point, as the second face image.

By means of filtering, within a set duration, the at least one first face image of the same person within the set duration, the number of first face images during each recognition can be effectively controlled such that the recognition result is more accurate. Moreover, the first face image having the smallest distance to the source point indicates a face having the smallest face angle in the face image, i.e., the face most approximate to the upright face.

In one or more optional embodiments, the face trajectory further includes a time stamp corresponding to the face image. The time stamp corresponds to a time of starting filtering the face image.

Filtering the face image in the face trajectory based on the distance between the three-dimensional vector and the source point includes:

obtaining, based on the distance from the three-dimensional vector to the source point in the at least one face image in the face trajectory within the first set duration, a face image having a smaller corresponding distance than a preset threshold, and storing the face image having a smaller corresponding distance than a preset threshold;

or, obtaining, based on the distance from the three-dimensional vector to the source point in the at least one face image in the face trajectory within the first set duration, a face image having the smallest corresponding distance, and storing the face image having the smallest corresponding distance. In some embodiment, by means of filtering face images within a set duration, a face trajectory with better quality within the duration is obtained, i.e., a face image with better quality is obtained, and a processing speed is increased. In subsequent operations, multiple set durations can be based to obtain face images with better quality to establish a new face trajectory, and a face image with better quality in all the face images within the multiple set durations is obtained based on the new face trajectory and quality-based filtering.

Figure 3:
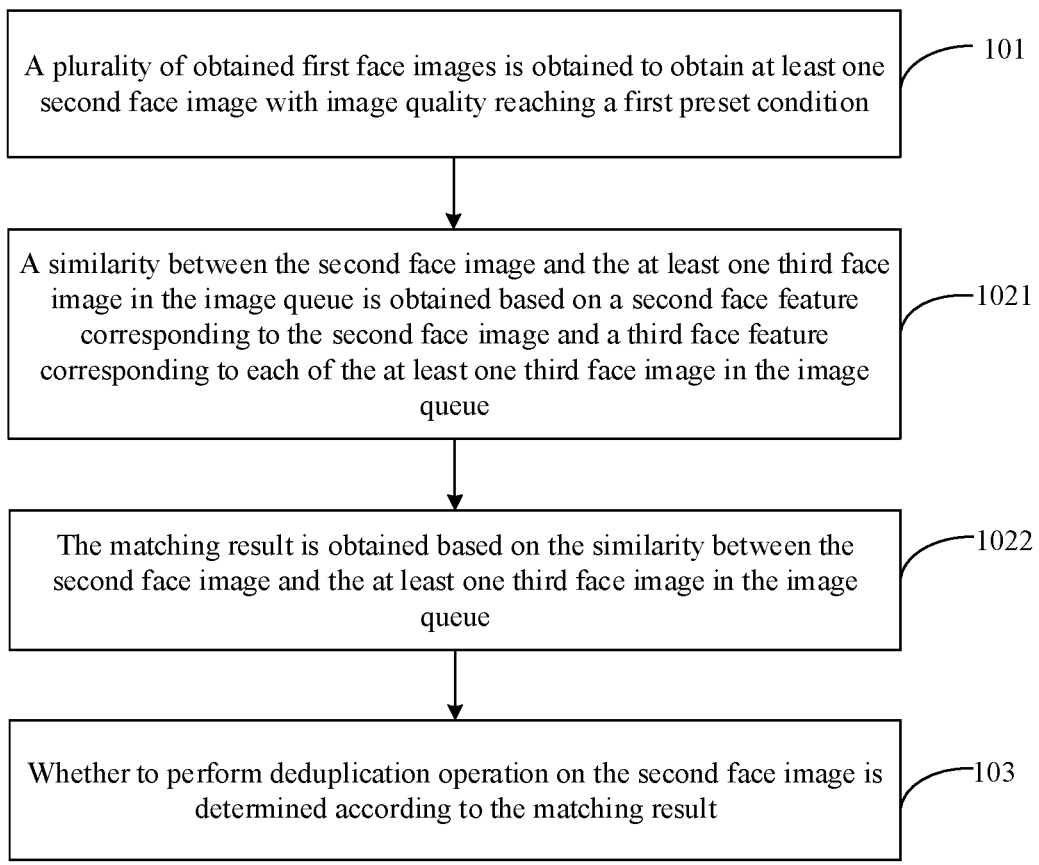
FIG. 3 is a flowchart of some embodiments of a method for face image deduplication according to the present disclosure.

According to another embodiment of the method for face image deduplication according to the present disclosure, as shown in FIG. 3, on the basis of the foregoing embodiments, block 102 includes blocks 1021 and 1022.

At block 1021, a similarity between the second face image and the at least one third face image in the image queue is obtained based on a second face feature corresponding to the second face image and a third face feature corresponding to each of the at least one third face image in the image queue; and At block 1022, the matching result is obtained based on the similarity between the second face image and the at least one third face image in the image queue.

According to one or more embodiments of the present disclosure, in response to that a third face image having a similarity to the second face image greater than or equal to a preset similarity exists in the image queue, a matching result indicating that the second face image has a matched image in the image queue is obtained; and/or in response to that a third face image having a similarity to the second face image greater than or equal to the preset similarity does not exist in the image queue, a matching result indicating that the second face image has no matched image in the image queue is obtained.

During the face deduplication implemented by the embodiments, similarity comparison is performed between an obtained face image with relatively good quality and a face image stored in the image queue, which is based on face features. The face feature of the obtained face image is obtained by means of a neural network. The image queue stores a face image or a face image as well as a face feature corresponding thereto, and in the case that the image queue stores merely a face image, if similarity comparison is required, a face feature corresponding to the pre-stored face image is firstly obtained by means of a neural network.

In a specific example of the foregoing embodiments of the method for face image deduplication according to the present disclosure, the obtaining a similarity between the second face image and the at least one third face image in the image queue based on a second face feature corresponding to the at least one second face image and a pre-stored face feature corresponding to each of the at least one third face image in the image queue includes:

separately determining a distance between the second face feature corresponding to each second face image and the third face feature corresponding to each third face image in the at least one third face image in the image queue; and obtaining the similarity between the each second face image and each of the at least one third face image in the image queue based on the distance.

According to one or more embodiments of the present disclosure, the similarity between corresponding face images is determined by calculating the distance between the face features. Specifically, the distance includes, but is not limited to, a cosine distance, a Euclidean distance, a Mahalanobis distance, etc. The smaller the distance between the face features is, the greater the similarity between the corresponding face images is. Whether the face images correspond to a same person is determined by setting a threshold (for example, the similarity is 0.86, 0.88, and so on). The value of the set threshold is adjusted according to actual requirements.

According to one or more embodiments of the present disclosure, in order to increase the speed of similarity recognition, similarity comparison is performed between the face image obtained in a set time period (such as 300 and 400 seconds) and the image queue within the set time period. Every time the set time period is reached, the similarity comparison is performed between the face image obtained within the time period and the image queue.

Figure 4:
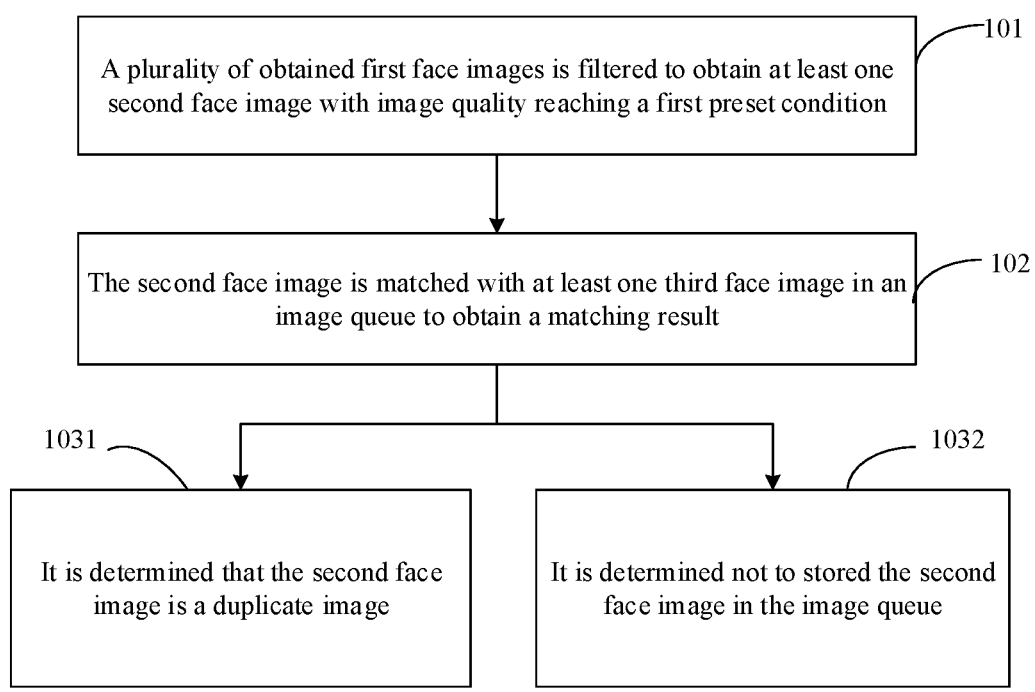
FIG. 4 is a flowchart of some embodiments of a method for face image deduplication according to the present disclosure.
Figure 5:
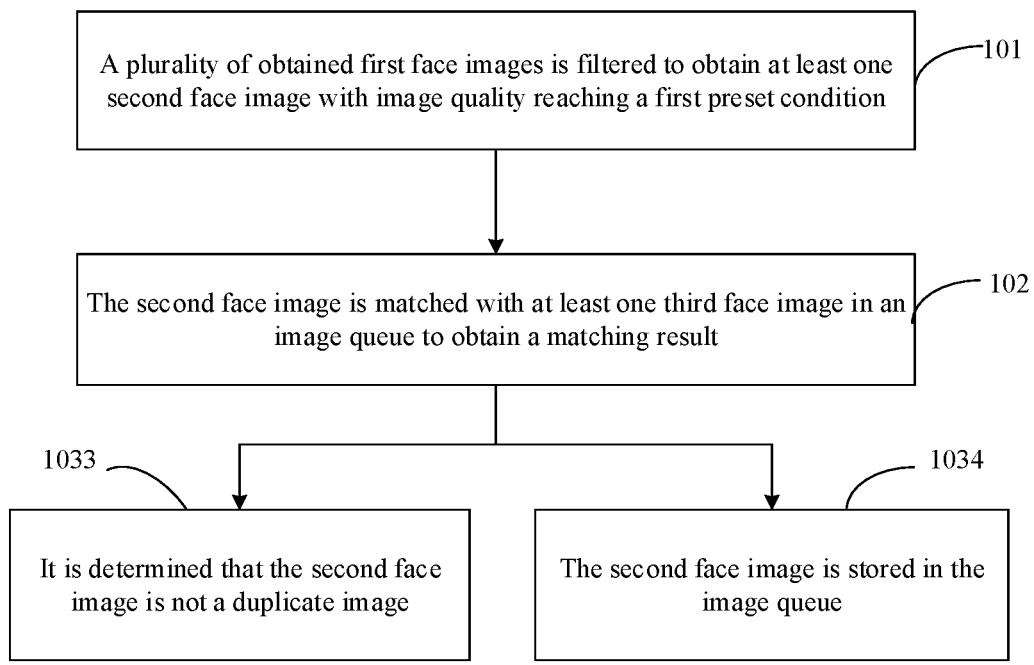
FIG. 5 is a flowchart of some embodiments of a method for face image deduplication according to the present disclosure.

In some examples of the foregoing embodiments of the method for face image deduplication according to the present disclosure, it is determined according to the matching result if there is an image in the image queue matching with the second face image, and if it is a yes, i.e., it is determined that there is an image in the image queue matching with the second face image, it goes to blocks 1031 and/or 1032 as shown in FIG. 4. If it is determined that there is no image in the image queue matching with the second face image, it goes to blocks 1033 and/or 1034 as shown in FIG. 5.

At block 1031, it is determined that the second face image is a duplicate image.

At block 1032, it is determined not to store the second face image in the image queue. In this case, the second face image may be abandoned or may be transmitted to other processing unit.

At block 1033, it is determined that the second face image is not a duplicate image.

At block 1034, the second face image is stored in the image queue.

According to one or more embodiments of the present disclosure, if the similarity between a face image and a certain face image in the image queue is greater than the preset threshold, it is indicated that these two face images are possible to correspond to a same person. In order to relieve the pressure on subsequent processing, only one face image is reserved for the same person; and in this case, the newly received face image can be directly deleted, or quality comparison is performed between the newly received face image and the third face image. If the newly received face image is better in quality, the pre-stored face image in the image queue is replaced by the newly received face image. If it is identified to be a duplicate image, the occurrence frequency corresponding to the face image can be accumulated and recorded, so as to facilitate providing information for subsequent statistical processing. If it is determined that the face image is not a duplicate image, the face image is added into the image queue so as to facilitate accurate recognition of other newly received face images during similarity matching.

According to yet another embodiment of the method for face image deduplication according to the present disclosure, on the basis of the foregoing embodiment, before operation 101, the method further includes:

obtaining the plurality of first face images based on at least one frame of video images.

In practical applications, a number of face images on which the method for face image deduplication needs to be performed is huge, such as face images obtained from multiple video images that are extracted from a video, or a large number of face images directly crawled from the internet. In some embodiment, if it is directed to the video images acquired from a video stream, the processing of a video stream According to one or more embodiments of the present disclosure includes:

acquiring, from a video stream, at least one frame of video images comprising a face image; and performing face recognition on the at least one frame of video images to obtain the plurality of first face images.

According to one or more embodiments of the present disclosure, the video images in the video stream are obtained by means of frame extraction. Both recognition and segmentation are performed on the face in the video image by mean of a neural network, or, face recognition is performed by means of the neural network and the face image is then segmented from the video image based on other segmentation technologies or other segmentation networks. A specific face recognition and segmentation technology is not limited in some embodiment, as long as it can achieve the purpose.

For example, a video stream is collected by means of an image collection device such as a provided camera, and the video stream is decomposed to obtain video images. The video images are recognized by means of a face recognition technology (such as a Convolutional Neural Network (CNN)) to obtain a video image having a face image; and then the face image is segmented from the video image by means of the image segmentation technology, thereby obtaining the collected face image. One frame of video image is possibly to include at least one face image, or is possibly to not include any face image. In the embodiments of the present disclosure, a video image with no face image is not collected. Furthermore, face image matting and Software Development Kit (SDK)-detection can be performed on the video images obtained by the decomposition. The first one of multiple face images detected in a same image matting is selected, and those with no face are filtered.

In one or more optional embodiments, before face recognition and segmentation are separately performed on the video frame, the method further includes:

acquiring at least one face image with a set size in the video images.

By means of face image size-based filtering, unidentifiable video images, i.e., those with no face image or with a small face image, are filtered, and video images including identifiable face images are reserved. Then, face recognition and segmentation are performed for the filtered video images. According to one or more embodiments of the present disclosure, the face image size-based filtering is based on the neural network or other filtering methods.

Figure 6:
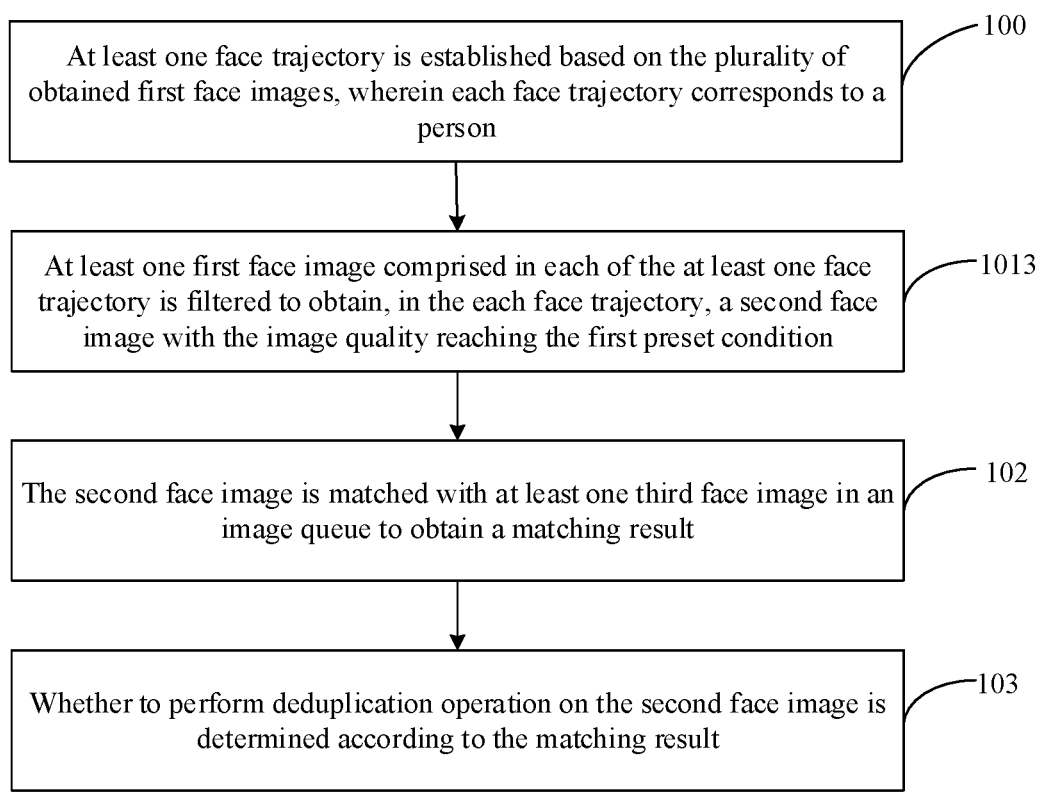
FIG. 6 is a flowchart of some embodiments of a method for face image deduplication according to the present disclosure.

In a specific example of the foregoing embodiments of the method for face image deduplication according to the present disclosure, as shown in FIG. 6, the method further includes block 100.

At block 100, at least one face trajectory is established based on the plurality of obtained first face images, where for example, each face trajectory corresponds to a person.

According to one or more embodiments of the present disclosure, as shown in FIG. 6, block 101 includes block 1013.

At block 1013, at least one first face image included in each face trajectory in the at least one face trajectory is filtered to obtain, in each face trajectory, a second face image with the image quality reaching the first preset condition.

In some embodiment, after obtaining the face image by means of image matting, the face trajectory is first established based on the face image, which provides the basis of deduplication on the face image of the same person in subsequent operations. The specific mode of establishing the face trajectory is not defined in the present disclosure.

The method for face image deduplication according to the present disclosure can be applied to intelligent video analysis, intelligent business, security monitoring, and other fields, such as a field relating to processing a video stream, a field relating to processing a large number of frame images and having a filtering requirement, and a field relating to uploading a large number of frame images to the cloud.

In a specific example of the foregoing embodiments of the method for face image deduplication according to the present disclosure, the method further includes: filtering and/or deduplicating the face images in the face trajectory to obtain a target face image corresponding to the face trajectory, and performing attribute detection and face matching based on the target face image.

According to one or more embodiments of the present disclosure, one exemplarily applicable scenario is: if a client device needs to perform attribute detection and face comparison on faces in a video collected in real time, it is necessary to select one frame most suitable for processing from multiple continuous frames of images comprising a same face, so as to better perform attribute detection and face comparison. In this case, it is necessary for the present solution to select an qualified face image.

Figure 7:
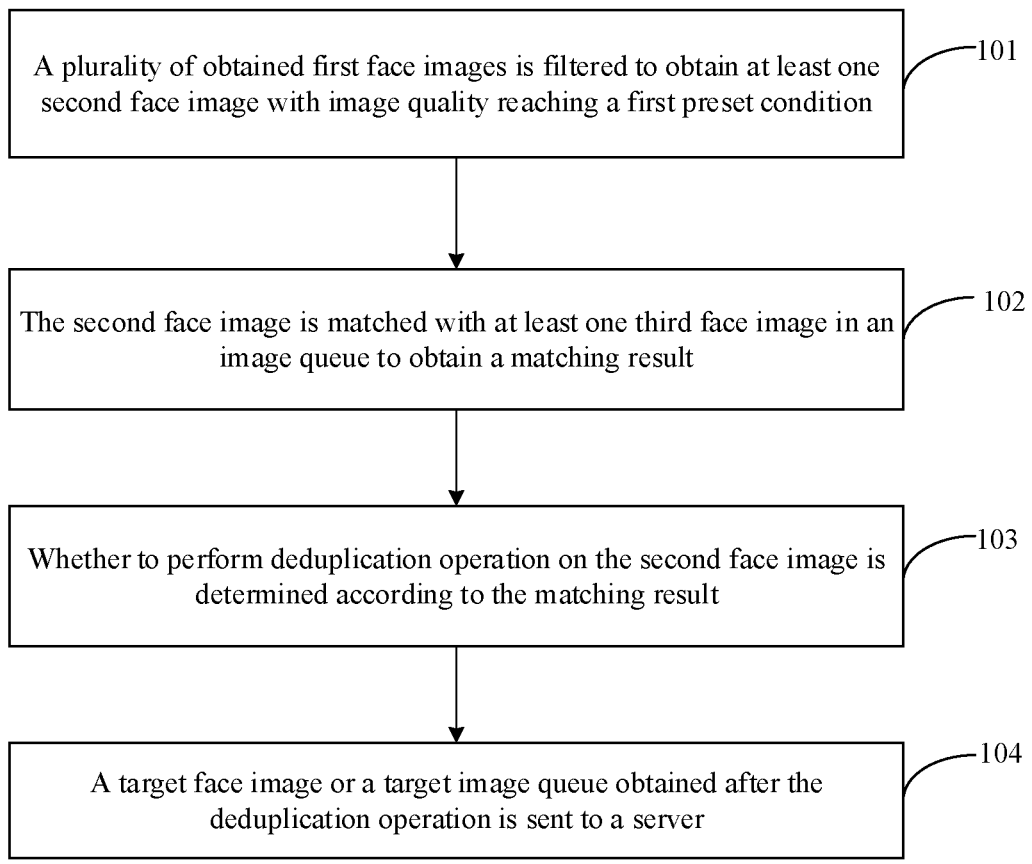
FIG. 7 is a flowchart of some embodiments of a method for face image deduplication according to the present disclosure.

In a specific example of the foregoing embodiments of the method for face image deduplication according to the present disclosure, the method is applied to the client device; and As shown in FIG. 7, the method further includes block 104.

At block 104, a target face image or a target image queue obtained after the deduplication operation is sent to a server.

According to one or more embodiments of the present disclosure, the server includes a local server and/or a cloud server.

The face image or image queue obtained after the filtering operation and/or deduplication operation is sent to the server and/or cloud server. The server and/or cloud server receives the face image or image queue subjected to the filtering and/or deduplication from the client device, compares the face image or a face image in image queue with a face image stored in an image database, determines whether the acquired face image or the face image in the image queue has a corresponding face image in the image database, and stores or does not store the face image or the image queue in the image database according to the determination result.

The image database is used for storing an acquired face image that is determined to be stored. In an initial state, the image database is empty or a face image has been stored therein. By continuously sending face images to the sever and/or cloud server, more and more qualified face images are automatically stored in the image database, thereby achieving the construction of the image database.

According to one or more embodiments of the present disclosure, another exemplarily applicable scenario is: the client device processes the video stream, and sends eligible face images to the cloud. In the case that the face images are all directly sent to the cloud, the cloud is overloaded, and those duplicate and poor-quality face images make little sense, and thus it is necessary for the client device to perform deduplication filtering before uploading the images to the cloud. In this case, the present solution is needed to select a better face image.

A person of ordinary skill in the art may understand that all or some steps of implementing the forgoing embodiments of the method may be achieved by a program by instructing related hardware; the foregoing program may be stored in a computer readable storage medium; when the program is executed, steps including the foregoing embodiments of the method are performed. Moreover, the foregoing storage medium includes various media capable of storing program codes such as ROM, RAM, a magnetic disk, or an optical disk.

Figure 8:
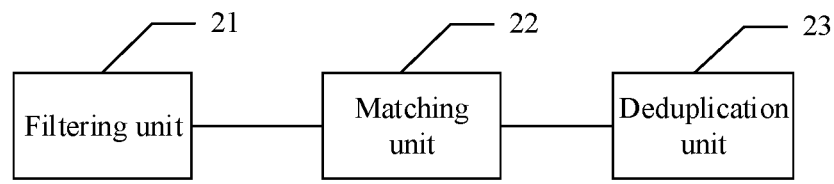
FIG. 8 is a schematic structural diagram of some embodiments of an apparatus for face image deduplication according to the present disclosure.

FIG. 8 is a schematic structural diagram of some embodiments of an apparatus for face image deduplication according to the present disclosure. The apparatus is used for implementing the foregoing embodiments of the method according to the present disclosure. As shown in FIG. 8, the apparatus includes:

a filtering unit 21, configured to filter a plurality of obtained first face images to obtain at least one second face image with image quality reaching a first preset condition.

A matching unit 22, configured to match the second face image with at least one third face image in an image queue to obtain a matching result.

In one or more optional embodiments, the image queue includes at least one third face image separately corresponding to a different person. It is practicable in the image queue that each third face image separately corresponds to a different person, or a part of images included therein separately corresponds to a different person. According to one or more embodiments of the present disclosure, whether two face images are matched is identified based on a distance between face features corresponding to the face images; and the distance between the face features includes a cosine distance, a Euclidean distance, etc. This embodiment does not limit a method for calculating a distance between specific features.

A deduplication unit 23, configured to determine, according to the matching result, whether to perform deduplication operation on the second face image.

If a face image obtained after filtering and a pre-stored face image correspond to the same person, the face image is a duplicate image, it is indicated that the face images corresponding to the person have been subjected to filtering deduplication, and at this time, the face image is chosen to be discarded or be used to replace the corresponding face image of the person in the image queue. However, if the face image obtained after filtering and the pre-stored face image do not correspond to the same person, the face image is not the duplicate image, it is indicated that a person corresponding to the face image is new, and the face image needs to be stored in the queue for use in subsequent recognition.

On the basis of the apparatus for face image deduplication provided in the foregoing embodiment of the present disclosure, quality-based filtering is achieved, the number of face images is greatly reduced, the obtained face image quality meets subsequent requirements for face image processing, and the problem of repeatedly processing a large number of face images is avoided; and since whether the face image is stored is determined according to the known image queue, the duplicate face image is identified more quickly.

According to another embodiment of the apparatus for face image deduplication according to the present disclosure, on the basis of the foregoing embodiment, the filtering unit 21 includes:

an attribute-based filtering module, configured to filter the plurality of obtained first face images based on a face attribute corresponding to the first face images, where a face attribute is used for indicating display quality of a face in a face image, and thus in some embodiment, the face attribute corresponding to the first face images is used for indicating the display quality of a face in the first face images. According to one or more embodiments of the present disclosure, the face attribute includes, but is not limited to, one or more of: a face angle, a face width and height value, and a face blurring degree. More specifically, the face angle includes, but is not limited to, a yaw angle for indicating a turning angle of a face in the horizontal direction, a pitch angle for indicating a rotation angle of the face in the vertical direction, and a roll angle for indicating a deflection angle of the face in the vertical direction;

and/or, an angle-based filtering module, configured to filter the plurality of obtained first face images based on the face angle in the first face images, where a face angle is used for indicating a deflection angle of a face in a face image, and thus in some embodiment, the face angle in the first face images is used for indicating a deflection angle of a face in the first face images. The deflection angle is relative to a standard upright face, which refers to a face with angle values in horizontal, vertical, and inclined directions are all equal to 0. The face is used as a source point to calculate the deflection angle of a face.

According to one or more embodiments of the present disclosure, the filtering unit 21 further includes a frame selection module, configured to filter multiple frames of face images obtained from a video stream. Face image-based frame selection from a video stream can be achieved by filtering multiple frames of face images in the video stream. The face images in a video frame obtained by means of frame selection all meet the first preset condition.

In one or more optional embodiments, the face attribute includes, but is not limited to, one or more of: the face angle, the face width and height value, and the face blurring degree; and the matching unit 22 is configured to, in response to meeting the first condition, determine that the image quality of the first face images reaches the first preset condition, where the first condition includes at least one of: the face angle is within a first preset range, the face width and height value is greater than a second preset threshold, and/or the face blurring degree is smaller than a third preset threshold.

In a specific example of the forgoing embodiments of the apparatus for face image deduplication according to the present disclosure, the attribute-based filtering module is further, configured to, in response to that the face angle is not within the first preset range, the face width and height value is smaller than or equal to the second preset threshold, and/or the face blurring degree is greater than or equal to the third preset threshold, delete a face image.

In a specific example of the foregoing embodiments of the apparatus for face image deduplication according to the present disclosure, the filtering unit is configured to identify, from the plurality of first face images, at least one first face image corresponding to the same person; and filter the at least one first face image corresponding to the same person to obtain, in the at least one first face image, a second face image with the quality reaching the first preset condition.

According to one or more embodiments of the present disclosure, a face trajectory is obtained based on the at least one face image corresponding to the same person; and a face image in the face trajectory is filtered based on the face angle corresponding to the face image to obtain, in the face trajectory, a face image with the quality reaching the first preset condition.

According to one or more embodiments of the present disclosure, the filtering unit is configured to, in the case of filtering the at least one first face image corresponding to the same person to obtain, in the at least one first face image, a second face image with the quality reaching the first preset condition, filter the at least one first face image corresponding to the same person based on the face angle corresponding to the first face image to obtain the second face image with the quality reaching the first preset condition.

In a specific example of the foregoing embodiments of the apparatus for face image deduplication according to the present disclosure, the face angle includes, but is not limited to, one or more of: a face yaw angle, a face pitch angle, and a face roll angle.

According to one or more embodiments of the present disclosure, the filtering unit includes:

an angle conversion module, configured to convert the face yaw angle, the face pitch angle, and the face roll angle corresponding to the first face image into a three-dimensional vector; and a vector-based filtering module, configured to filter the face image in the at least one first face trajectory corresponding to the same person based on a distance from the three-dimensional vector to a source point to obtain the second face image with the quality reaching the first preset condition, where the source point is a three-dimensional vector with all values equal to 0.

According to one or more embodiments of the present disclosure, the filtering unit is configured to, in the case of identifying, from the plurality of first face images, at least one first face image corresponding to the same person, identify, from the plurality of first face images, at least one first face image corresponding to the same person within a first set duration; and the vector-based filtering module is configured to determine a first face image in the at least one first face image, of which three-dimensional vector has a smallest distance with the source point, as the second face image.

In a specific example of the foregoing embodiments of the apparatus for face image deduplication according to the present disclosure, the face trajectory further includes a time stamp corresponding to the face image. The time stamp corresponds to a time of starting filtering the face image.

The vector-based filtering module is configured to obtain, based on the distance from the three-dimensional vector to the source point in the at least one face image in the face trajectory within the first set duration, a face image having a smaller corresponding distance than a preset threshold, and store the face image having a smaller corresponding distance than a preset threshold;

or, obtain, based on the distance from the three-dimensional vector to the source point in the at least one face image in the face trajectory within the first set duration, a face image having the smallest corresponding distance, and store the face image having the smallest corresponding distance. According to another embodiment of the apparatus for face image deduplication according to the present disclosure, on the basis of the foregoing embodiment, the matching unit 22 includes: a similarity module, configured to obtain a similarity between the third face image and the at least one third face image in the image queue based on a second face feature corresponding to the second face image and a third face feature corresponding to each of the at least one third face image in the image queue; and a result matching module, configured to obtain the matching result based on the similarity between the second face image and the at least one third face image in the image queue.

According to one or more embodiments of the present disclosure, the result matching module is configured to, in response to that a third face image having a similarity to the second face image greater than or equal to a preset similarity exists in the image queue, obtain a matching result indicating that the second face image has a matched image in the image queue; and/or in response to that a third face image having a similarity to the second face image greater than or equal to the preset similarity does not exist in the image queue, obtain a matching result indicating that the second face image has no matched image in the image queue.

This embodiment implements face deduplication, where similarity comparison is performed between an obtained face image with better quality and a face image stored in the image queue, and is based on the face features; the face feature of the obtained face image is obtained by means of a neural network; moreover, the image queue stores the face image or the face image and the face feature corresponding thereto; and in the case that only the face image is stored, if similarity comparison is required, the face feature corresponding to the pre-stored face image is firstly obtained by means of the neural network.

In a specific example of the foregoing embodiments of the apparatus for face image deduplication according to the present disclosure, the similarity module is configured to separately determine a distance between the second face feature corresponding to each second face image and the pre-stored face feature corresponding to each third face image in the at least one third face image in the image queue; and obtain the similarity between the each second face image and each of the at least one third face image in the image queue based on the distance.

In a specific example of the foregoing embodiments of the apparatus for face image deduplication according to the present disclosure, the deduplication unit 23 is configured, in response to the matching result indicating that the second face image has a matched image in the image queue, to determine that the second face image is a duplicate image, and/or, not to store the second face image in the image queue.

According to one or more embodiments of the present disclosure, the deduplication unit 23 is further, configured to, in response to the matching result indicating that the second face image has no matched image in the image queue, determine that the second face image is not a duplicate image, and/or, store the second face image in the image queue.

According to yet another embodiment of the apparatus for face image deduplication according to the present disclosure, on the basis of the foregoing embodiment, the apparatus further includes:

an image acquisition unit, configured to obtain the plurality of first face images based on at least one frame of video images.

In practical application, the implementation of the method for face image deduplication necessarily requires a large number of face images, such as face images obtained from multiple video frames extracted from a video, or a large number of face images directly crawled from a network. This embodiment is directed to the video frames acquired from a video stream. As for processing a video stream, According to one or more embodiments of the present disclosure, the image acquisition unit includes:

a frame extraction module, configured to acquire, from a video stream, at least one frame of video images comprising a face image; and an recognition and segmentation module, configured to perform face recognition on the at least one frame of video images to obtain the plurality of first face images.

In one or more optional embodiments, the image acquisition unit further includes:

a face acquisition module, configured to acquire at least one face image with a set size in the video images.

In a specific example of the foregoing embodiments of the apparatus for face image deduplication according to the present disclosure, the image acquisition unit further includes:

a trajectory establishment module, configured to establish at least one face trajectory based on the plurality of obtained first face images, where each face trajectory corresponds to a person; and the filtering unit is configured to filter at least one first face image comprised in each of the at least one face trajectory, so as to obtain a second face image in the each face trajectory with the image quality reaching the first preset condition.

In a specific example of the foregoing embodiments of the apparatus for face image deduplication according to the present disclosure, the image acquisition unit is further, configured to filter and/or deduplicate the face images in the face trajectory to obtain a target face image corresponding to the face trajectory, and perform attribute detection and face matching based on the target face image.

In a specific example of the foregoing embodiments of the apparatus for face image deduplication according to the present disclosure, the apparatus is applied to a client device; and:

the apparatus further includes:

a sending unit, configured to send to a server a target face image or image queue obtained after deduplication.

The server includes a local server and/or a cloud server.

An electronic device provided according to one aspect of the embodiments of the present disclosure includes a processor, where the processor includes the apparatus for face image deduplication according to any one of the foregoing embodiments of the present disclosure.

An electronic device provided according to one aspect of the embodiments of the present disclosure includes: a memory, configured to store an executable instruction; and a processor, configured to communicate with the memory to execute the executable instruction so as to implement the operations according to any one of the foregoing embodiments of the method for face image deduplication according to the present disclosure.

A computer storage medium provided according to one aspect of the embodiments of the present disclosure is configured to store a computer readable instruction, where when the instruction is executed, and the operations according to any one of the foregoing embodiments of the method for face image deduplication of the present disclosure are implemented.

A computer program provided according to one aspect of the embodiments of the present disclosure includes a computer readable code, where when the computer readable code runs on a device, a processor in the device executes an instruction for implementing any of the foregoing embodiments of the method for face image deduplication of the present disclosure.

Figure 9:
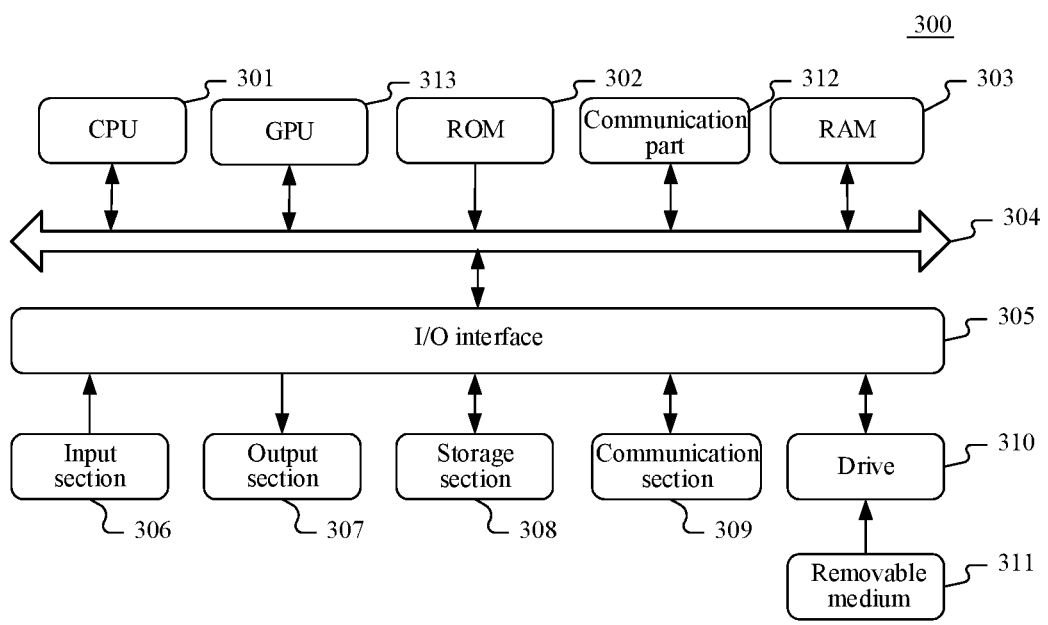
FIG. 9 is a schematic structural diagram of an electronic device configured to implement a terminal device or a server according to embodiments of the present disclosure.

The embodiments of the present disclosure also provide an electronic device which, for example, is a mobile terminal, a Personal Computer (PC), a tablet computer, a server, and the like. Referring to FIG. 9 below, a schematic structural diagram of an electronic device 300, which may be a terminal device or a server, suitable for implementing the embodiments of the present disclosure is shown. As shown in FIG. 9, the electronic device 300 includes one or more processors, a communication part, and the like. The one or more processors are, for example, one or more Central Processing Units (CPUs) 301 and/or one or more Graphic Processing Units (GPUs) 313, and may execute appropriate actions and processing according to executable instructions stored in a Read-Only Memory (ROM) 302 or executable instructions loaded from a storage section 308 to a Random Access Memory (RAM) 303. The communication part 312 may include, but is not limited to, a network card. The network card may include, but is not limited to, an Infiniband (IB) network card.

The processor may communicate with the ROM 302 and/or the RAM 303 to execute the executable instruction, is connected to the communication part 312 by means of a bus 304, and communicates with other target devices by means of the communication part 312, so as to implement the operations corresponding to any method provided in the embodiments of the present disclosure, for example, filtering a plurality of obtained face images to obtain at least one face image with image quality reaching a first preset condition; matching each face image in the at least one face image with at least one face image pre-stored in an image queue to obtain a matching result; and determining, according to the matching result, whether to deduplicate the face image.

In addition, the RAM 303 may further store various programs and data required for operations of an apparatus. The CPU 301, the ROM 302, and the RAM 303 are connected to each other by means of the bus 304. In the presence of the RAM 303, the ROM 302 is an optional module. The RAM 303 stores executable instructions, or writes the executable instructions into the ROM 302 during running, where the executable instructions cause the CPU 301 to execute corresponding operations of the foregoing communication method. An input/output (I/O) interface 305 is also connected to the bus 304. The communication part 312 may be integrated, or may be, configured to have a plurality of sub-modules (for example, a plurality of IB network cards) connected to the bus.

The following components are connected to the I/O interface 305: an input section 306 including a keyboard, a mouse and the like; an output section 307 including a cathode-ray tube (CRT), a liquid crystal display (LCD), a speaker and the like; the storage section 308 including a hard disk and the like; and a communication part 309 of a network interface card including an LAN card, a modem and the like. The communication section 309 performs communication processing via a network such as the Internet. A drive 310 is also connected to the I/O interface 305 according to requirements. A removable medium 311 such as a magnetic disk, an optical disk, a magneto-optical disk, a semiconductor memory or the like is mounted on the drive 310 according to requirements, so that a computer program read from the removable medium may be installed on the storage section 308 according to requirements.

It should be noted that the architecture illustrated in FIG. 9 is merely an optional implementation mode. During specific practice, the number and types of the components in FIG. 9 may be selected, decreased, increased, or replaced according to actual requirements. Different functional components may be separated or integrated or the like. For example, the GPU 313 and the CPU 301 may be separated, or the GPU 313 may be integrated on the CPU 301, and the communication part may be separated from or integrated on the CPU 301 or the GPU 313 or the like. These alternative implementations all fall within the scope of protection of the present disclosure.

Particularly, the process described above with reference to the flowchart according to the embodiments of the present disclosure may be implemented as a computer software program. For example, the embodiments of the present disclosure include a computer program product, which includes a computer program tangibly included in a machine readable medium. The computer program includes a program code for executing a method shown in the flowchart. The program code may include instructions for executing each corresponding step of the method provided in the embodiments of the present disclosure, for example, filtering a plurality of obtained face images to obtain at least one face image with image quality reaching a first preset condition; matching each face image in the at least one face image with at least one face image pre-stored in an image queue to obtain a matching result; and determining, according to the matching result, whether to deduplicate the face image. In such embodiment, the computer program is downloaded and installed from the network through the communication section 309, and/or is installed from the removable medium 311. The computer program, when being executed by the CPU 301, executes the foregoing functions defined in the method of the present disclosure.

The embodiments in the specification are all described in a progressive manner, for same or similar parts in the embodiments, refer to these embodiments, and each embodiment focuses on a difference from other embodiments. The system disclosed in the embodiments corresponds to the method disclosed in the embodiments, and therefore is described relatively simply. For related parts, reference may be made to related descriptions of the method embodiments.

The methods and devices in the present disclosure may be implemented in many manners. For example, the methods and devices in the present disclosure may be implemented with software, hardware, firmware, or any combination of software, hardware, and firmware. The foregoing specific sequence of steps of the method is merely for description, and unless otherwise stated particularly, is not intended to limit the steps of the method in the present disclosure. In addition, in some embodiments, the present disclosure may also be implemented as programs recorded in a recording medium. The programs include machine readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed for many modifications and changes are obvious to persons of ordinary skill in the art. The embodiments are selected and described to better describe the principles and actual applications of the present disclosure, and to enable persons of ordinary skill in the art to understand the present disclosure, so as to design various embodiments with various modifications suitable for particular use.

The invention claimed is:

1. A method for face image deduplication, comprising:
filtering a plurality of obtained first face images to obtain at least one second face image with image quality reaching a first preset condition;
matching the second face image with at least one third face image in an image queue to obtain a matching result; and
determining, according to the matching result, whether to perform deduplication operation on the second face image,
wherein the filtering the plurality of obtained first face images to obtain at least one second face image with image quality reaching a first preset condition comprises:
identifying, from the plurality of first face images, at least one first face image corresponding to a same person; and
filtering the at least one first face image corresponding to the same person to obtain the second face image with the quality reaching the first preset condition in the at least one first face image,
wherein the filtering the at least one first face image corresponding to the same person to obtain a second face image with the quality reaching the first preset condition in the at least one first face image comprises:
filtering, based on a face angle corresponding to each first face image, the at least one first face image corresponding to the same person to obtain the second face image with the quality reaching the first preset condition, which comprises:
converting the face yaw angle, the face pitch angle, and the face roll angle corresponding to the first face image into a three-dimensional vector; and
filtering the at least one first face image corresponding to the same person based on a distance from the three-dimensional vector to a source point to obtain the second face image with the quality reaching the first preset condition, wherein the source point is a three-dimensional vector with all values equal to 0.

2. The method according to claim 1, wherein the image queue comprises at least one third face image, each of which corresponds to a different person.

3. The method according to claim 1, wherein the filtering the plurality of obtained first face images comprises at least one of:
filtering the plurality of obtained first face images based on a face attribute corresponding to each first face image, wherein the face attribute corresponding to each first face image is used for indicating display quality of a face in the each first face image; or
filtering the plurality of obtained first face images based on a face angle in the first face images, wherein the face angle in the first face images is used for indicating a deflection angle of a face in the first face images.

4. The method according to claim 3, wherein the face attribute comprises one or more of: the face angle, a face width and height value, and a face blurring degree; and
the filtering the plurality of obtained first face images based on a face attribute corresponding to the first face images comprises:
in response to a first condition being satisfied, determining that the image quality of the first face images reaches the first preset condition, wherein the first condition comprises at least one of: the face angle is within a first preset range, the face width and height value is greater than a second preset threshold, or the face blurring degree is smaller than a third preset threshold.

5. The method according to claim 1, wherein the identifying, from the plurality of first face images, at least one first face image corresponding to the same person comprises:
identifying, from the plurality of first face images, at least one first face image corresponding to the same person within a first set duration; and
the filtering the at least one first face image corresponding to the same person based on a distance from the three-dimensional vector to a source point to obtain the second face image with the quality reaching the first preset condition comprises:
determining a first face image in the at least one first face image, of which three-dimensional vector has a smallest distance with the source point, as the second face image.

6. The method according to claim 1, wherein the matching the second face image with at least one third face image in an image queue to obtain a matching result comprises:
obtaining a similarity between the second face image and the at least one third face image in the image queue based on a second face feature corresponding to the second face image and a third face feature corresponding to each of the at least one third face image in the image queue; and
obtaining the matching result based on the similarity between the second face image and the at least one third face image in the image queue.

7. The method according to claim 6, wherein the obtaining the matching result based on the similarity between the second face image and the at least one third face image in the image queue comprises at least one of:
in response to that a third face image having a similarity to the second face image greater than or equal to a preset similarity exists in the image queue, obtaining a matching result indicating that the second face image has a matched image in the image queue; or
in response to that a third face image having a similarity to the second face image greater than or equal to the preset similarity does not exist in the image queue, obtaining a matching result indicating that the second face image has no matched image in the image queue.

8. The method according to claim 7, wherein the obtaining a similarity between the second face image and the at least one third face image in the image queue based on a second face feature corresponding to the at least one second face image and a pre-stored face feature corresponding to each of the at least one third face image in the image queue comprises:
separately determining a distance between the second face feature corresponding to each second face image and the third face feature corresponding to each third face image in the at least one third face image in the image queue; and
obtaining the similarity between the each second face image and each of the at least one third face image in the image queue based on the distance.

9. The method according to claim 1, wherein the determining, according to the matching result, whether to perform deduplication operation on the second face image comprises at least one of:
in response to the matching result indicating that the second face image has a matched image in the image queue, determining that the second face image is a duplicate image, or, not storing the second face image in the image queue.

10. The method according to claim 1, wherein the determining, according to the matching result, whether to perform deduplication operation on the second face image comprises at least one of:

in response to the matching result indicating that the second face image has no matched image in the image queue, determining that the second face image is not a duplicate image, or, storing the second face image in the image queue.

11. The method according to claim 1, wherein before the filtering the plurality of obtained first face images, the method further comprises:

obtaining the plurality of first face images based on at least one frame of video images.

12. The method according to claim 11, wherein the obtaining the plurality of first face images based on at least one frame of video images comprises:

acquiring, from a video stream, at least one frame of video image comprising a face image; and performing face recognition on the at least one frame of video image to obtain the plurality of first face images.

13. The method according to claim 12, wherein before the performing face recognition on the at least one frame of video images, the method further comprises:

acquiring at least one face image with a set size in the video image.

14. The method according to claim 11, further comprising:

establishing at least one face trajectory based on the plurality of obtained first face images, wherein each face trajectory corresponds to a person; and the filtering the plurality of obtained first face images to obtain at least one second face image with image quality reaching a first preset condition comprises:

filtering at least one first face image comprised in each of the at least one face trajectory, so as to obtain the second face image in the each face trajectory with the image quality reaching the first preset condition.

15. The method according to claim 1, wherein the method is applied to a client device; and the method further comprises:

sending a target face image or a target image queue obtained after the deduplication operation to a server.

16. An apparatus for face image deduplication, comprising:

a memory storing processor-executable instructions; and a processor arranged to execute the stored processor-executable instructions to perform:

filtering a plurality of obtained first face images to obtain at least one second face image with image quality reaching a first preset condition;

matching the second face image with at least one third face image in an image queue to obtain a matching result; and determining, according to the matching result, whether to perform deduplication operation on the second face image, wherein the filtering the plurality of obtained first face images to obtain at least one second face image with image quality reaching a first preset condition comprises:

identifying, from the plurality of first face images, at least one first face image corresponding to a same person; and filtering the at least one first face image corresponding to the same person to obtain the second face image with the quality reaching the first preset condition in the at least one first face image, wherein the filtering the at least one first face image corresponding to the same person to obtain a second face image with the quality reaching the first preset condition in the at least one first face image comprises:

filtering, based on a face angle corresponding to each first face image, the at least one first face image corresponding to the same person to obtain the second face image with the quality reaching the first preset condition, which comprises:

converting the face yaw angle, the face pitch angle, and the face roll angle corresponding to the first face image into a three-dimensional vector; and filtering the at least one first face image corresponding to the same person based on a distance from the three-dimensional vector to a source point to obtain the second face image with the quality reaching the first preset condition, wherein the source point is a three-dimensional vector with all values equal to 0.

17. A non-transitory computer-readable storage medium having stored thereon computer-readable instructions that, when executed by a processor, cause the processor to execute the following:

filtering a plurality of obtained first face images to obtain at least one second face image with image quality reaching a first preset condition;

matching the second face image with at least one third face image in an image queue to obtain a matching result; and determining, according to the matching result, whether to perform deduplication operation on the second face image, wherein the filtering the plurality of obtained first face images to obtain at least one second face image with image quality reaching a first preset condition comprises:

identifying, from the plurality of first face images, at least one first face image corresponding to a same person; and filtering the at least one first face image corresponding to the same person to obtain the second face image with the quality reaching the first preset condition in the at least one first face image, wherein the filtering the at least one first face image corresponding to the same person to obtain a second face image with the quality reaching the first preset condition in the at least one first face image comprises:

filtering, based on a face angle corresponding to each first face image, the at least one first face image corresponding to the same person to obtain the second face image with the quality reaching the first preset condition, which comprises:

converting the face yaw angle, the face pitch angle, and the face roll angle corresponding to the first face image into a three-dimensional vector; and filtering the at least one first face image corresponding to the same person based on a distance from the three-dimensional vector to a source point to obtain the second face image with the quality reaching the first preset condition, wherein the source point is a three-dimensional vector with all values equal to 0.

18. The apparatus according to claim 16, wherein the image queue comprises at least one third face image, each of which corresponds to a different person.

19. The apparatus according to claim 16, wherein the filtering the plurality of obtained first face images comprises at least one of:
- filtering the plurality of obtained first face images based on a face attribute corresponding to each first face image, wherein the face attribute corresponding to each first face image is used for indicating display quality of a face in the each first face image; or
- filtering the plurality of obtained first face images based on a face angle in the first face images, wherein the face angle in the first face images is used for indicating a deflection angle of a face in the first face images.

20. The apparatus according to claim 19, wherein the face attribute comprises one or more of: the face angle, a face width and height value, and a face blurring degree; and
- the filtering the plurality of obtained first face images based on a face attribute corresponding to the first face images comprises:
- in response to a first condition being satisfied, determining that the image quality of the first face images reaches the first preset condition, wherein the first condition comprises at least one of: the face angle is within a first preset range, the face width and height value is greater than a second preset threshold, or the face blurring degree is smaller than a third preset threshold.

* * * * *